Patented Aug. 15, 1933

1,922,283

UNITED STATES PATENT OFFICE 1,922,283

MANUFACTURE OF CRYSTALLINE MATERIALS

Henry Oscar Dering, Staines, England, assignor to Superfine Chemicals Limited, London, England No Drawing. Application May 12, 1930, Serial No. 451,866, and in Great Britain May 13, 1929

2 Claims. (Cl. 23—1)

The present invention concerns a method for the production of crystalline substances, particularly salts, in an improved form, which is chiefly useful by reason of the fact that substances prepared in this form show an increased rate of solution as compared with the same substances in the ordinary crystalline form. This increased rate of solution results from the large surface area which the crystalline form produced according to the invention shows in proportion to the mass of the substance. While the process according to the present invention is applicable to a great number of crystalline materials, as will be hereinafter indicated, it should be understood that it may not be applicable to all such materials.

The phenomenon of supersaturation of salt solutions has been known for many years in the laboratory, and it has also been realized that the crystallization of such supersaturated solutions may be induced by seeding with a crystal of the dissolved material. Now, according to the present invention, which is concerned with substances which normally produce relatively unstable supersaturated solutions, i. e. supersaturated solutions which are, for example, sensitive to vibration, it has been found that such substances can readily be made to produce supersaturated solutions on a commercial scale, thorough investigation having shown that by taking certain precautions, in particular by cooling the supersaturated solutions in a quiescent state in vessels having smooth, substantially continuous inner surfaces, and in such manner that evaporation at the surface of the solution is prevented, the commercial production of such crystalline materials from supersaturated solutions is possible on a large scale. By crystallization of such solutions at suitable temperatures and concentrations it is possible to obtain a better article which may be placed on the market at possibly a lower cost, but at any rate without increasing the cost of the article, as compared with that now generally sold, while the substances themselves offer great advantages over the present commercial product on account of their good appearance and ready solution.

The process therefore consists in producing a hot concentrated solution of the substance in question, cooling this solution in a quiescent state so that supersaturation results, the cooling being conducted in vessels of the type specified, evaporation at the surface being prevented by one of the methods hereinafter specified and thereupon seeding and/or agitating the supersaturated solution at a suitable cool temperature thus causing the dissolved material to separate rapidly in a crystalline form in which the surface area is large compared with the mass.

Although the process needs a little more care than is normally employed in the known commercial process for the crystallization of materials it has the great advantage that the whole crop of crystals represents a salable product which is rarely, if ever, the case with normal crystallization in which a solid agglomerate is formed at the sides and bottom of the vessel, while a crust is formed on the surface of the liquid. These solid crystalline agglomerates in the case of a high grade product must be removed, and recrystallized with a subsequent batch of material since, as they are of a solid character, they cannot usually be sold together with the main product. Frequently, these solid "sides" and "bottoms" form 20% of the crop. In the present process, however, the crystals are produced either as discrete bodies or as an interlacing mass, which readily breaks down on slight disturbance, and which adheres very slightly, if at all, to the walls and bottom of the vessel. All that remains to be done in such a case, therefore, instead of carefully removing the centre portion of the crop as is frequently the practice, is first to drain the bulk of the liquor from the crystals and then to transfer the entire remaining contents of the crystallizing vessel to an hydroextractor or similar device, whereby most of the adhering liquor is removed from the crystals. Thus, while the process needs care in the cooling stages, increased yield, improved quality and formation of the product and the subsequent ease in the isolation thereof from the mother liquor more than repay the initial care necessary.

Substances treated according to the process commonly show definite crystalline characteristics differing from the characteristics of the material crystallized in the ordinary fashion. Usually the difference appears to be a relative restriction of the growth of the crystal in one or more directions.

It is essential that evaporation of the surface of the solution during cooling is prevented as such evaporation tends to form a skin on the surface which immediately induces crystallization. It is necessary also to avoid disturbance of the liquid during cooling as this also induces crystallization.

With regard to the second point, it has been shown that convection currents in the supersaturated liquid produced as a result of uneven cooling do not apparently produce crystallization in some instances, whereas if cooling is too rapid at the outer surface in other cases crystallization ensues. Then again, a sharp tap on the crystallizing vessel in most instances induces crystallization in the liquid.

The presence of sharp points within the liquid appears in all cases to favour crystallization of the supersaturated liquid, and for that reason, therefore, it is essential, to ensure consistent working, that the crysallization pans or vessels used in the process are smooth on the inner surface, and that the vessels are so constructed that the curvature at any point has a radius not less than approximately half an inch although much sharper curves are not necessarily fatal to supersaturation. The whole of the inner surfaces of the crystallizing vessels are, with advantage, enamelled with an enamel as free as possible from pinholes and other unevennesses.

The crystals produced by agitation or stirring are usually of smaller dimensions than those produced by seeding, but at the same time differ entirely in character from the crystals formed by the ordinary process of granulation. Ten minutes is usually sufficient to produce complete crystallization of the crop. It has also been found in some instances that the certainty of supersaturation is greater the smaller the capacity of the vessels. This is, to a certain extent, however, obvious as clearly there is a greater chance of the fortuitous initation of crystallization in a large bulk of liquid than in a small bulk of liquid, and the choice of size of the crystallizing vessels, therefore, will depend firstly on the substance under consideration and secondly on the care with which the hot solution is prepared. Thus, for example, in the case of magnesium sulphate, it has been found that supersaturation may readily be achieved, even with solutions which contain solid impurities such as are frequently present in the commercial grades of this substance. On the other hand, in the case of sodium carbonate, it is necessary to ensure that the solution which it is intended should become supersaturated is as free from suspended matter as is practically attainable. In the case of certain substances it is not possible to induce the supersaturation of hot solutions of all concentrations. In others practically any hot solution, provided, of course, that it is sufficiently concentrated, may be made to produce a supersaturated solution.

With regard to the prevention of the formation of a skin on the surface of the liquid while cooling, a manner of operation in practice is to cover the hot solution with a layer of water. This should be done as far as possible without disturbing the underlying liquid, and it has been found that it is immaterial whether the water layer applied is hotter or colder than the solution on which it is placed as in either case the diffusion observed is negligible during the time occupied in cooling. It has also been found possible to keep the surface of the solution free from skin by covering the crystallizing vessel with a close fitting cover above the surface of the liquor. In this way the atmosphere is maintained constantly saturated, and as the vessel cools a certain quantity of the water vapour condenses both at the surface of the liquid and on the underside of the cover, as, however, dropping of the water from the inside of the cover on to the surface of the liquid may, in the case of certain substances, produce sufficient disturbance of the liquid to induce crystallization, the occasions when this method may be employed may be readily determined by test. Dripping from the cover may, however, be prevented by suitably dishing or otherwise shaping the same so that the condensed water tends to collect at the periphery of the cover and flow quietly down the walls of the vessel to the surface of the liquid.

In certain instances it has been found advisable to use a layer of a liquid immiscible with water to prevent the formation of crusts on the surface of the liquid. A case in point is that of borax, which, although it cannot readily be made to produce a supersaturated solution with medium concentrations does so at very high concentrations, which may be instanced as a case in which supersaturation appears only to be produced when the surface of the liquid is covered with a liquid immiscible with water, say paraffin.

The water layer may be introduced to the surface of the liquid without material disturbances thereof in various ways, but it has been found to be suitable to float a small piece of thin board, or other light material on the surface of the hot solution and to allow the water to run on to the top surface of the board, whence it flows smoothly over the remaining surface of the hot solution. When sufficient water has been added, usually a depth of about ½" suffices, the small portion of board is removed as carefully as possible and the liquid allowed to cool.

The following examples will serve to illustrate the particular temperatures, concentrations and precautions which must be observed according to this invention in the case of certain of the more important substances to which the invention has at present been found to be applicable.

*Example 1.*—The heptahydrate of magnesium sulphate $MgSO_4 7H_2O$ commonly known as "Epsom" salts may be prepared in the form of very fine, readily soluble needles by cooling a solution of approximate specific gravity of 1.33 at 100° C. so that supersaturation ensues, and seeding this at 20° C. when a yield of crystals of about 3 lbs. per gallon or original liquor is produced. As a guide, 36 litres of cold liquor of specific gravity 1.25 at 15° C. and 19.7 kgs. of ordinary crystalline, Epsom salts will on warming produce 48.6 litres of the necessary hot liquor, or alternatively, 2 litres of water and 3 kgs. of Epsom salts on warming will produce 3.76 litres of the necessary hot solution. The bulk density of the product as compared with ordinary Epsom salts is 65:100 and the product is characterized by a very much increased rate of solution as compared with the ordinary product.

The magnesium sulphate as obtained as a crude commercial product contains a considerable proportion of insoluble impurities, and while the supersaturated solution of this salt is not as sensitive as are certain other supersaturated salt solutions the liquid should, in the interests of the production of a high grade pharmaceutical preparation, be suitably filtered before being allowed to cool.

*Example 2.*—The decahydrate of sodium carbonate, $Na_2CO_3 10H_2O$, commonly termed "washing soda" may be produced as a lustrous flake formation by seeding at about 20° C. the supersaturated solution formed by cooling a solution having a specific gravity of 1.24 at 50° C. Thus, 2.5 litres of water and 4.47 kgs. of ordinary washing soda will produce about 5.6 litres of the hot liquor. The yield in this case is approximately 5 lbs. of crystals per gallon of liquor.

This product is of particular use in the production of bath salts, as its solubility is very rapid as compared with the normal product, the crystals being in the form of thin flakes. It has been found that sodium carbonate is more sensitive than is magnesium sulphate to the presence of solid impurities, and at the same time to too rapid cooling. Whereas magnesium sulphate may be cooled in a water jacket, sodium carbonate must be allowed to cool much more slowly in order to avoid the formation of solid "sides".

*Example 3.*—Sodium sulphate, the decahydrate of which ($Na_2SO_4 10H_2O$) is known as "Glauber's" salt, may be obtained in the form of very large thin flakes from a solution of 450 kgs. of crystalline sodium sulphate in 250 litres of water cooled from 50° C. at which temperature the specific gravity is 1.25. The yield from this quantity of liquor is about 150 kgs.

By varying the concentration of the initial solution the formation and size of the crystals may also be varied considerably, as is the case also with sodium carbonate. This variation is well illustrated in the case of sodium thiosulphate.

*Example 4.*—In the table given below the crystal formations of the pentahydrate $Na_2S_2O_3 5H_2O$ produced on seeding solutions of sodium thiosulphate of varying concentration are shown opposite the corresponding specific gravities at 60° C.

a. Specific gravity 1.39 very large needles (small yield).

b. Specific gravity 1.44 formation intermediate between flakes and needles.

c. Specific gravity 1.5 coarse plates or flakes.

d. Specific gravity 1.59 fine soft plates or flakes.

As an example, the rate of solubility in equal volumes of cold water for equal weights under the same conditions compare as follows:

Ordinary "pea" crystal "hypo" dissolved in three minutes.

"c" dissolved in two minutes.

"d" completely dissolved in one minute.

I claim:—

1. Process for the production of large surfaced crystals of uniform size and loose crystalline form from substances normally producing unstable supersaturated solution which includes the steps of producing a hot concentrated solution of the substances to be crystallized, cooling the solution under quiescent conditions while preventing evaporation from the surface thereof and inducing crystallization in the supersaturated solution so produced, the initial concentration of the hot solution and the temperature of crystallization being such that the degree of supersaturation induced is a high degree of labile supersaturation.

2. The process of crystallizing, which comprises heating the crystals in a solvent until they form a substantially saturated solution, adding to the surface of the solution a liquid which is immiscible with the solvent of the solution, cooling the solution at a slow rate and in a vessel having a substantially smooth and continuous inner surface so as to prevent convection currents in the solution and to produce a highly unstable labile supersaturated solution, and thereafter crystallizing the dissolved material.

HENRY OSCAR DERING.